Sept. 18, 1956 W. S. OLIWA 2,763,854

COMPARISON CIRCUIT

Filed Jan. 29, 1953

| A | B | C | D | DIGIT | 1 | 2 | 4 | 8 | PERIOD |
|---|---|---|---|---|---|---|---|---|---|
| -20 | 0 | 0 | -20 | 9 | 0 | -20 | -20 | 0 | 1 |
| 0 | 0 | 0 | -20 | 8 | -20 | -20 | -20 | 0 | 2 |
| -20 | -20 | -20 | 0 | 7 | 0 | 0 | 0 | -20 | 3 |
| 0 | -20 | -20 | 0 | 6 | -20 | 0 | 0 | -20 | 4 |
| -20 | 0 | -20 | 0 | 5 | 0 | -20 | 0 | -20 | 5 |
| 0 | 0 | -20 | 0 | 4 | -20 | -20 | 0 | -20 | 6 |
| -20 | -20 | 0 | 0 | 3 | 0 | 0 | -20 | -20 | 7 |
| 0 | -20 | 0 | 0 | 2 | -20 | 0 | -20 | -20 | 8 |
| -20 | 0 | 0 | 0 | 1 | 0 | -20 | -20 | -20 | 9 |
| 0 | 0 | 0 | 0 | 0 | -20 | -20 | -20 | -20 | 10 |

| $28_1$ | $28_2$ | $28_4$ | $28_8$ | DIGIT | 1 | 2 | 4 | 8 |
|---|---|---|---|---|---|---|---|---|
| X | X | X | X | 0 | -20 | -20 | -20 | -20 |
| X | Y | Y | X | 9 | 0 | -20 | -20 | 0 |
| Y | Y | Y | X | 8 | -20 | -20 | -20 | 0 |
| X | X | X | Y | 7 | 0 | 0 | 0 | -20 |
| Y | X | X | Y | 6 | -20 | 0 | 0 | -20 |
| X | Y | X | Y | 5 | 0 | -20 | 0 | -20 |
| Y | Y | X | Y | 4 | -20 | -20 | 0 | -20 |
| X | X | Y | Y | 3 | 0 | 0 | -20 | -20 |
| Y | X | Y | Y | 2 | -20 | 0 | -20 | -20 |
| X | Y | Y | Y | 1 | 0 | -20 | -20 | -20 |

CLOSED = X
OPEN = Y

INVENTOR
WALTER S. OLIWA
BY William S. Glover
AGENT

United States Patent Office 2,763,854 Patented Sept. 18, 1956

2,763,854

COMPARISON CIRCUIT

Walter S. Oliwa, Summit, N. J., assignor to Monroe Calculating Machine Company, Orange, N. J., a corporation of Delaware Application January 29, 1953, Serial No. 334,032

15 Claims. (Cl. 340—316)

This invention relates to comparison circuits for use in data processing devices, and more particularly to a comparison circuit for identifying items of data expressed as coded electric signals, through comparison thereof with representations of all of the items which they might be.

Comparison circuits of the sort with which the present invention is concerned, although capable of use in a wide variety of settings wherein a signal which by its time of occurrence, or its duration, represents an item of intelligence, is required or desired, are particularly well suited for extracting intelligence from an electronic computer or the like, and, under control of said intelligence, effecting timely operation of printing hammers associated with print wheels and the like or appropriate setting of indicator dials or other differentially settable members.

In general, the chief drawback of prior comparison circuits of the sort described has been the amount of apparatus required and the cost of manufacturing and maintaining the same.

The principal object of the invention, therefore, is the provision of a comparison circuit of the sort described which involves a minimum amount of apparatus, which is economical to manufacture and maintain, and which is extremely efficient and dependable.

According to the invention there is provided a comparison circuit which includes one diode for each point or element of the code in which the information to be compared is represented, switching means associated with each diode, said switching means, in one form, comprising a second diode and a resistor, and in another, mechanical switches, and cyclically operable means for effecting successive differential operations of said switching means during each cycle in accordance with a predetermined pattern adapted to effect the production of differentially timed match or comparison signals for each of the characters which is to be compared.

Other objects and features of the invention will become apparent from the following description when read in the light of the drawings of which:

Figures 1, 2, 3, 4:
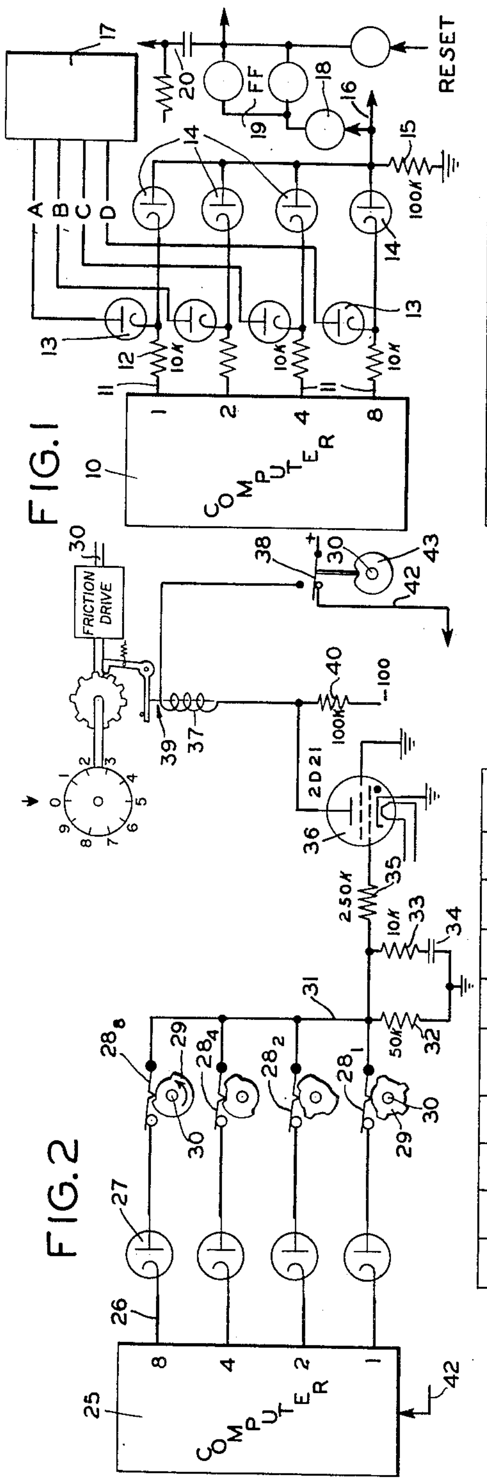
Fig. 1 is a schematic wiring diagram of one embodiment of the invention.
Fig. 2 is a schematic wiring diagram of another embodiment of the invention.
Fig. 3 is a chart illustrating the manner in which certain signals are applied to the circuit of Fig. 1 and the results obtained thereby; and, Fig. 4 is a chart similar to that of Fig. 3 but applicable to the circuit of Fig. 2.

In order to avoid unnecessary complication, the following description is limited to the comparing of digital information expressed in the binary coded decimal system of notation, but it is to be understood that the means to be described are applicable also to alphabetical information and to both digital and alphabetical information expressed in other systems of notation or other codes.

Referring to Fig. 1, digital information is transmitted from a computer or other device 10 over four conductors 11 which have the digital values of 1, 2, 4, and 8 as indicated. For convenience, it will be assumed that information applied to said conductors by the unit 10 is in the form of voltage potentials, 0 volts to indicate binary 1 and −20 volts to indicate binary 0, and that each set of signals applied to the four lines to represent a decimal digit is maintained on the lines for a complete cycle which may be of any suitable length.

Each conductor 11 is connected through a resistor 12 to the cathodes of a pair of diodes 13 and 14. The anodes of the several diodes 14 are connected in common to a resistor 15 which is applied to ground, and also to an output line 16 for the circuit. Preferably the resistors 12 are of the order of 10,000 ohms while the resistor 15 is of the order of 100,000 ohms, said values providing output line 16 with a low potential of between −18 and −20 volts when one or more of the diodes 14 conduct. The anodes of the diodes 13 are connected to a signal unit 17 which may be of any suitable sort adapted to produce, in succession, signals indicative in the binary coded decimal notation of the digits 9, 8, 7, 6, 5, 4, 3, 2, 1, 0. For convenience, the connections to the anodes of the diodes 13 are lettered A, B, C, and D which, it will be understood, represent the values 1, 2, 4, and 8 respectively. Preferably, the unit 17 produces a potential of −20 volts to indicate binary one and a potential of 0 volts to indicate binary zero. A cycle of operation is measured by the time required for unit 17 to produce, in succession, signals, representations of all ten decimal digits, and any suitable means may be provided to synchronize the output of unit 10 with the cyclic rate of unit 17, that is, to effect transmittal of one digit representation from unit 10 preparatory to each cycle of operation of unit 17.

It will be seen, therefore, that on each cycle of operation the decimal digit represented by the potential states of the conductors 11 is compared during successive periods of one-tenth cycle each with successive ones of the decimal digits 9, 8, 7, 6, 5, 4, 3, 2, 1, 0, in that order, as represented by the potential states of the lines A, B, C, and D. Obviously, non-comparisons or non-matches are obtained during each period of cycle, prior to the one during which the states of the lines A, B, C, and D represent the same digit as is indicated by the conductors 11. Thus, a signal produced on obtaining a match or comparison indicates by its time of occurrence in a cycle, the value of the digit represented by the potential states of the conductors 11 during that cycle.

In order to facilitate an understanding of the manner in which the described circuitry effects the operation of comparison, the operation of one pair of diodes 13 and 14 (Fig. 1) to compare the binary digit represented by the potential state of a conductor 11 with the binary digit represented by the potential state of the associated line A, B, C, or D will be described.

If a high potential (0 volts) indicative of binary one is applied to a resistor 12 the diode 14 is maintained non-conducting regardless of whether a high potential indicative of binary zero or a low potential (−20 volts) indicative of binary one is applied over the associated line A, B, C, or D, to the anode of diode 13. It is assumed of course that the diodes do not conduct unless the potentials applied to their cathodes are somewhat negative with respect to the potentials applied to their anodes. When, however, a low potential (−20 volts) indicative of binary zero is applied to a resistor 12 the state of conduction of the diode 14 is dependent on the state of conduction of the associated diode 13. If the diode 13 is maintained non-conducting by the application to its anode of a low potential (−20 volts) indicative of binary one, the low potential applied to resistor 12 appears at the cathode of diode 14 and the latter conducts. But when a high potential indicative of binary zero (0 volts) is applied to the anode of diode 13 over the associated line A, B, C, or D, said diode conducts and due to the resultant current flow through resistor 12, the high potential appears at the cathode of diode 14 to maintain the same non-conducting.

It is believed evident, therefore, that a diode 14 is maintained non-conducting not only when the associated conductor 11 and line A, B, C, or D assume potentials indicative of binary zero concurrently but also whenever the associated conductor 11 assumes a potential indicative of binary one. The only condition which brings about conduction of a diode 14 is that where the associated conductor 11 assumes a potential indicative of binary zero and the appropriate line A, B, C, or D, assumes a potential indicative of binary one.

Speaking now of the complete circuit of Fig. 1, the output line 16 assumes a high potential (0 volts) only when all of the diodes 14 are maintained non-conducting, and a low potential (−18 to −20 volts) when one or more of the diodes is conducting. A low potential on output line 16 indicates a non-match or non-comparison and a high potential on said line indicates a match (comparison). It is to be noted, however, that if the code representation for any character involves the application of high potentials to all of the conductors 11, then output line 16 assumes a high potential indicative of a match (comparison) as soon as said high potentials are applied to the lines 11, regardless of the potential states of the lines A, B, C, and D. Therefore, in those instances wherein it is desired that some character be represented by binary ones, or high potentials, in all of the code positions, the first portion of each cycle of operation must be reserved for indicating on output line 16 the presence or absence of said representation on the input lines 11. For example, if sixteen characters are represented by the code in use, the first one-sixteenth of each cycle must be reserved.

It is also to be noted that the order in which the various code representations are generated by unit 17 must be regulated to ensure that for any given state of the conductors 11 other than that in which all assume a high potential, each code representation generated by unit 17 prior to that for the character represented by the state of the conductors 11, includes the application of a low potential indicative of binary one to at least one line, A, B, C, or D, associated with a conductor 11 having a low potential indicative of binary zero applied to it. Thus, at least one diode 14 conducts during each period of cycle prior to that in which a match (comparison) occurs and output line 16 is maintained at a low potential until that time. In order to comply with the requirement set forth in the last paragraph, when the binary coded decimal system of notation or a similar code is used, it is necessary to compare each digit transmitted from the unit 10 with the ten decimal digits in descending order, that is, 9, 8, 7 . . . 1, 0. This is illustrated in Fig. 3 from which it can also be seen that following a true match or comparison, one or more spurious matches may be indicated (by the potential of line 16). For example, if the output of unit 10 is a six, non-matches are indicated during the first three periods of cycle, a match is indicated during the fourth period, a non-match during the fifth period, a match during the sixth period, a non-match during the seventh period, a match during the eighth period, a non-match during the ninth period and another match during the tenth period. Obviously, only the first match, that obtained during the fourth period of cycle, is a true match.

Therefore, the means controlled by the output line 16 of the comparison circuit must be of a sort such that it is affected in an appropriate manner by the first rise in potential of output line 16 during each cycle but is not affected by subsequent drops and rises in potential of said line during the same cycle. For example, rises in potential of line 16 may be used to operate a puller or driver 18 adapted to set a flip-flop 19 or other bistable device which is reset preparatory to each cycle of operation. The flip-flop and puller may, if desired, be identical with the flip-flop 56 and puller 55 or 61 of Fig. 8 of applicant's U. S. Patent 2,641,753. Evidently the first rise in potential of line 16 during each cycle effects setting of the flip-flop which remains set until the end of the cycle regardless of subsequent drops and rises in potential of said line. In this arrangement the time at which the flip-flop is set or the amount of time for which it remains set indicates the digit transmitted from the unit 10 (Fig. 1) over the conductors 11. For example, the flip-flop may be used to effect stopping and holding of an indicator dial which is advanced in synchronism with the operation of unit 17, in appropriate position. If, however, it is desired that the said digit be represented by an appropriately timed, sharp pulse, as, for example, a pulse adapted to control firing of a printing hammer against a type wheel or segment advancing in synchronism with the operation of unit 17, an appropriate output of the flip-flop may be applied to a differentiating circuit 20 which, on setting of the flip-flop, produces a single sharp pulse adapted to operate suitable hammer firing means, for example, a solenoid. Of course, when the latter arrangement is used, the advance of the type carrier must lag behind the operation of unit 17 an amount equal in time to the delays afforded by the flip-flop and the differentiator and the "pull-up" time of the solenoid, if one is used. Also, an arrangement such as that discussed may be used to flash a lamp for a stroboscopic indicator rotating in synchronism with the operation of unit 17.

It is believed evident, therefore, that the comparison circuit of Fig. 1 is adapted for use in a variety of settings and is capable of controlling the operation of various indicating and printing and other differentially operable means.

Referring now to Fig. 2, there is disclosed a modified form of the invention which is particularly well suited for controlling the positioning of indicator dials and the like. As shown the digital output of a computer or the like 25 is transmitted over four conductors 26 having the binary coded decimal values, 1, 2, 4, and 8, to the cathodes of four diodes 27. Preferably, the conductors 26 assume a potential of 0 volts to represent binary 1 and a potential of −20 volts to indicate binary 0. The anodes of the four diodes 27 are connected to switches 28 which, for convenience of description, are given the subscripts 1, 2, 4, and 8, appropriate to the conductors 26 with which they are associated. The switches 28 are controlled by cams 29 mounted on a shaft 30. Each cam 29 is designed to effect opening and closing of the associated switch 28 in accordance with the chart of Fig. 4. All of the switches 28 are connected by a common conductor 31 and a resistor 32 with a source of ground potential. A second resistor 33 and a condenser 34, in series therewith, parallels the resistor 32 for a purpose to be explained hereinafter. The common conductor 31 is also connected through a grid limiting resistor 35 with the control grid of a thyratron 36. Preferably, the cathode and second grid of the thyratron are grounded. The anode of the thyratron is connected through a coil 37 and a switch 38 with a source of suitable positive potential. Coil 37 serves, when energized, to actuate any suitable means 39 for halting the advance of a dial or other differentially advanceable member. For example, the coil may be the coil of a solenoid whose plunger interposes a stop in the path of a projection on the dial or other member. The anode of the thyratron is also connected through a resistor 40 to a source of negative potential, say −100 volts, to effect rapid quenching of the tube once the switch 38 has been opened. The switch 38 comprises a transfer contact adapted to connect the source of positive potential either to the coil 37 or to a conductor 42 under control of a synchronizing cam 43 on the shaft 30. In the normal or rest position of the system, the source of positive potential is connected to the conductor 42. When the shaft 30 is in any position other than its normal or rest position the source of positive potential is connected to the coil 37.

The cams 29 serve in substantially the same capacity as the signal generator 17 of the circuit of Fig. 1, the opening and closing of the switches 28 differentially replacing the effects of the high and low potentials from said unit 17 on the diodes 13. As mentioned above, the switches 28 have the values 8, 4, 2, and 1 and each is closed to represent a binary 1 and is opened to represent a binary 0. For reasons to appear hereinafter, the order in which the 10 decimal digits are represented by the positions of the cams 29 during each cycle begins with the digit 0 and then proceeds from 9 downwardly through 1.

Considering just one of the diodes 27 and the associated switch 28, it will be seen that if a high potential indicative of binary 1 is applied to the cathode of the diode, the diode is maintained non-conducting on closure of the switch and the conductor 31 assumes a high (0 volts) potential. However, if a low potential indicative of binary 0 is applied to the cathode of the diode, closure of the associated switch 28 effects conduction of the diode and the resultant current flow through resistor 32 lowers the potential of the common conductor 31 to approximately −20 volts. Obviously, when a switch 28 is open the state of conduction of the associated diode 27 has no effect on the potential level of conductor 31. Speaking now of the complete circuit of Fig. 2, the common conductor 31 assumes a low potential (−20 volts) only when a low potential indicative of binary zero is applied to one or more conductors 26 associated with closed switches 28. Under all other conditions, that is, when all of the switches 28 are open (a combination which, for reasons to be discussed hereinafter, cannot be used) and when high potentials indicative of binary one are applied to all conductors 26 associated with closed switches 28, the common conductor 31 assumes a high potential (0 volts). A high potential on conductor 31 indicates a match or comparison and a low potential thereon indicates a non-match or non-comparison. It is to be noted that the order in which the various code representations are set up on the switches 28 by the cams 29 must be regulated to ensure that for any given state of the conductors 26, each setting of the switches 28 prior to that for the character represented by the state of the conductors 26, includes the application of a low potential indicative of binary zero to at least one conductor 26 associated with a switch 28 that is closed to represent binary one. Thus, at least one diode 27 conducts during each period of cycle prior to that in which a match (comparison) occurs, and the common conductor 31 is maintained at a low potential until that time. A code representation which calls for opening of all of the switches 28 cannot be utilized as this condition makes it impossible for the circuit to indicate a non-match. However, a code representation which calls for high potentials on all of the conductors 26, although it, when present on said conductors, does prevent the circuit from indicating a non-match, can be utilized if the cams 29 are designed to effect closure of an otherwise unused one or combination of the switches 28 during the first period of each cycle. Obviously, in this arrangement, a comparison signal is obtained during the first period of a cycle only if all of the conductors 26 are at a high potential.

In order to comply with the requirements set forth above, when the binary coded decimal system of notation is utilized, it is necessary to compare each digit transmitted from unit 25 with the decimal digits 9, 8, 7, 6, 5, 4, 3, 2, 1 in that order. When the digit zero is represented by the conductors 26 the same are all at a low potential and it is impossible for the common conductor 31 to assume a high potential to indicate a comparison. However as the normal position of shaft 30 is considered to be zero position, it is not necessary to provide a comparison signal when the digit zero is the one to be compared. This will become more apparent hereinafter. It is to be noted that all of the switches 28 are closed when the cams 29 are in their zero positions. This, of course, is done to obviate the difficulties which arise when all of the switches are opened concurrently.

From all of the above it is believed evident that on each cycle of operation the conductor 31 assumes a low potential during each period prior to that in which a match or comparison is obtained, at which time the conductor assumes a high potential. When said conductor 31 is at a low potential it maintains the thyratron 36 in cut off condition, but when it assumes a high potential indicative of a match (comparison) the thyratron conducts and effects energization of coil 37. Said coil, as mentioned above, serves to actuate a stop which, in the instant embodiment of the invention, cooperates with an indicator dial mounted on and frictionally driven by the shaft 30 or another shaft synchronized therewith. Evidently, if the dial is normally aligned with the cams 30 in appropriate manner, the operation of coil 37 stops the dial in position to display the character represented by the state of the conductors 26. The dial is held in the position in which it is stopped until at the end of the cycle the shaft 30 reaches normal position and the cam 43 effects cutoff of thyratron 36 and deenergization of coil 37. This, of course, frees the dial to rotate with the shaft in its adjusted position thereon during subsequent cycles and the selected digit is displayed each time the shaft reaches its normal position.

The mechanical details of the dial and the stop therefor form no part of the present invention and thus will not be described further. However, it is to be mentioned that the dial should be designed to display the digit zero when it is in its normal position on the shaft and the shaft is also in its normal position. Further suitable means should be provided for returning the dial to its normal position on the shaft at suitable times.

The synchronizing cam 43 serves not only to effect cutoff of the thyratron 36 and the deenergization of coil 37 when the shaft 30 reaches its normal or zero position, but also to effect application of a high potential to the conductor 42. This conductor may be used in a variety of ways. For example, it may be used to transmit a signal to unit 25 that the comparison circuit is ready to receive another digit from said unit.

If desired, the means illustrated in Fig. 2 may be used to position a plurality of dials one after the other merely by moving the dials laterally to bring them successively into position for cooperation with the stop operated by coil 37.

It is to be mentioned that the circuit of Fig. 1 may be utilized for controlling dials in the same manner as the circuit of Fig. 2 by utilizing the cams 29 and switches 28 or similar means to provide the signals A, B, C, and D. Also, if it is desired to control a plurality of dials in parallel one signal generator such as unit 17 of Fig. 1 or the cams 29 of Fig. 2 may be used to control the operation of a plurality of the comparison circuits of Fig. 1 or Fig. 2, one such circuit for each dial.

The purpose of the condenser 34 is to prevent firing of thyratron 36 by a transient pulse (0 volts) produced by simultaneous opening of all of the switches 29 as the result of contact bounce or the like as the cams 29 rotate. The resistor 33 is connected in series with the condenser to prevent the latter from acting as a short circuit to ground when a low potential (−20 volts) is applied to a diode 26 associated with a closed switch 28.

It will be seen, therefore, that there has been provided a comparison circuit which includes one diode for each point or element of the code in which the information to be compared is represented, switching means associated with each diode, said switching means, in one form, comprising a second diode and a resistor, and in another, mechanical switches and cyclically operable means for effecting successive differential operations of said switching means during each cycle in accordance with a predetermined pattern adapted to effect the production of differentially timed match or comparison signals for each of the characters which is to be compared.

It is also to be understood that although the invention has been described as embodying vacuum tube diodes, other types of diodes may be substituted therefor, for example, germanium diodes may be used.

While there have been above described but a limited number of embodiments of the invention, it is to be understood that many changes can be made therein without departing from the spirit of the invention and it is not desired, therefore, to limit the invention except as pointed out in the following claims or as dictated by the prior art.

I claim:

1. A cyclically operable comparison circuit for comparing, on each cycle, any one of *n* possible characters of intelligence as represented in code by a high or low potential for each point of the code, with representations of all *n* characters in succession, and for producing a timed signal when a comparison is achieved, comprising means for producing said high and low potentials, means for producing said representations in predetermined order, a diode for each point of the code, said high and low potentials being applied to the cathodes of the diodes, a common conductor connecting the anodes of the diodes and providing an output line for the circuit, a source of said high potential, a resistor connecting said conductor with said source, and switching means associated with said diodes and controlled by said representation producing means alternatively to permit or prevent conduction of each diode when a said low potential is applied thereto.

2. The combination according to claim 1 wherein the predetermined order in which the character representations are produced is such that at least one diode having a said low potential applied thereto is permitted to conduct by said switching means under control of each representation which occurs prior to that for the character being compared.

3. The combination according to claim 2 wherein the said switching means comprises a resistor of much smaller magnitude than the first said resistor, connected to the cathode of each diode and through which said high and low potentials are applied to the diode, and a second diode having its cathode connected to each resistor, said representations being high and low potentials applied to the anodes of the second diodes.

4. The combination according to claim 2 wherein the said switching means comprises mechanical switches connecting the anodes of the diodes with said common conductors, and said representation producing means comprises means for opening and closing the switches differentially.

5. The combination according to claim 2 wherein the said switching means comprises mechanical switches connecting the anodes of the diodes with said common conductors and said representation producing means comprises cams operating to open and close the switches differentially.

6. A cyclically operable comparison circuit for comparing, on each cycle, any one of a plurality of possible characters of intelligence as represented in code by a high or low potential for each point of the code, with representations of all of the said plurality of characters in succession, comprising means for producing said high and low potentials, means for producing said representations in predetermined order, a diode for each point of the code, said high and low potentials being applied to the cathodes of the diodes, a common conductor connecting the anodes of the diodes, a source of said high potential, a resistor connecting said conductor with said source, and switching means associated with said diodes and controlled by said representation producing means alternatively to permit or prevent conduction of each diode when a said low potential is applied thereto, said predetermined order of production of the said representations being such that each representation prior to that for the character being compared controls the switching means to permit conduction of at least one diode to which a low potential is applied.

7. The combination according to claim 6 and including a bistable device connected to said common conductor and set to one state when the same assumes substantially the high potential of said source, and means for resetting the bi-stable device to the opposite state preparatory to each cycle.

8. The combination according to claim 7 wherein the said switching means comprises a resistor of much smaller magnitude than the first said resistor, connected to the cathode of each diode and through which said high and low potentials are applied to the diode, and a second diode having its cathode connected to each resistor, said representations being high and low potentials applied to the anodes of the second diodes.

9. The combination according to claim 7 wherein the said switching means comprises mechanical switches connecting the anodes of the diodes with said common conductors and said representation producing means comprises means for opening and closing the switches differentially.

10. The combination according to claim 7 and including a differentiating circuit connected to said bi-stable device and actuated on setting of the latter to said one state.

11. The combination according to claim 10 wherein the said switching means comprises a resistor of much smaller magnitude than the first said resistor, connected to the cathode of each diode and through which said high and low potentials are applied to the diode, and a second diode having its cathode connected to each resistor, said representations being high and low potentials applied to the anodes of the second diodes.

12. Means to stop a rotating indicator dial in position to display any character thereof, comprising, a shaft rotated in synchronism with the dial, means for producing code signals indicative of any said character, said signals being in the form of a high or a low potential for each point of the code, a diode for each point of the code, said potentials being applied to the cathodes thereof, a conductor common to all of the diodes, individual switches connecting the anodes of the diodes to said conductor, a source of said high potential, a resistor connecting said conductor and said source, a cam mounted on said shaft for each point of the code and effective to open and close the switches differentially in accordance with said code as the shaft rotates, in such order that during every position of the dial prior to that in which the displayed character matches that represented by said high and low potentials, at least one switch associated with a diode having a low potential applied thereto is closed, a thyratron having its control grid connected to said common conductor and fired on assumption of said high potential by the common conductor, an electromagnet operative to effect stopping of the dial, having its coil connected to the anode of the thyratron, a source of anode potential for the thyratron connected to said coil, a switch operative to disconnect the source of anode potential from the coil, a cam on said shaft for operating said switch when the shaft is in normal position, and a signal line to which the switch connects the source when it is operated.

13. Means for controlling the positioning of a differentially advanceable member in accordance with items of intelligence expressed, in code, as a high or low potential for each point of the code, comprising, means for producing said high and low potentials, a diode for each point of the code, said potentials being applied to the cathodes thereof, a common conductor connecting the anodes of the diodes, a source of said high potential, a resistor connecting said source and said conductor, means synchronized with the advance of said member for producing, in succession, representations of all of the items of intelligence which it is possible for the item represented by said potentials to be, switching means controlled by said representations alternatively to permit or prevent conduction of each diode when a low potential is applied to the latter, the order of occurrence of said representations being such that each representation prior to that for the item indicated by said potentials permits conduction of at least one diode, a bi-stable device connected to said conductor and set to one state on assumption of said high potential by the latter, electromagnetic means effective to halt the advance of said member having its coil connected to said bistable device to be energized on setting of the latter to said one state, and means for resetting the bi-stable device to the opposite state preparatory to each advance of said member.

14. The combination according to claim 13 wherein the switching means comprises individual switches connecting the anodes of the diodes with said common conductor and said representation producing means comprises cams advanced in synchronism with said member and effective to open and close the switches differentially.

15. The combination according to claim 14 wherein the means for resetting the bi-stable device comprises a switch, and a cam synchronized with the first said cams to operate the switch and effect said resetting when the cams are in normal position.

References Cited in the file of this patent

UNITED STATES PATENTS

| | | |
|---|---|---|
| 2,318,591 | Couffignal | May 11, 1943 |
| 2,401,621 | Desch et al. | June 4, 1946 |
| 2,533,242 | Gridley | Dec. 12, 1950 |
| 2,580,768 | Hamilton et al. | Jan. 1, 1952 |
| 2,591,555 | Klopt | Apr. 1, 1952 |
| 2,607,006 | Hoeppner | Aug. 12, 1952 |
| 2,609,439 | Marshall et al. | Sept. 2, 1952 |
| 2,610,243 | Burkart et al. | Sept. 9, 1952 |
| 2,615,127 | Edwards | Oct. 21, 1952 |
| 2,641,696 | Woolard | June 9, 1953 |
| 2,672,601 | Welby | Mar. 16, 1954 |
| 2,676,289 | Wulfsberg et al. | Apr. 20, 1954 |

OTHER REFERENCES

Description of a Magnetic Drum Calculator, The Annals of the Computation Laboratory of Harvard University, vol. 25; copyright August 22, 1952; pp. 197–200 inclusive only.